US008511024B2

(12) United States Patent
MacDonald et al.

(10) Patent No.: US 8,511,024 B2
(45) Date of Patent: Aug. 20, 2013

(54) VENEERS FOR WALLS, RETAINING WALLS AND THE LIKE

(75) Inventors: Robert A. MacDonald, Plymouth, MN (US); William B. Dawson, Medina, MN (US)

(73) Assignee: Keystone Retaining Wall Systems LLC, West Chester, OH (US)

( * ) Notice: Subject to any disclaimer, the term of this patent is extended or adjusted under 35 U.S.C. 154(b) by 21 days.

(21) Appl. No.: 12/551,070

(22) Filed: Aug. 31, 2009

(65) Prior Publication Data

US 2009/0313936 A1  Dec. 24, 2009

Related U.S. Application Data

(63) Continuation of application No. 11/117,077, filed on Apr. 28, 2005, now abandoned.

(60) Provisional application No. 60/566,616, filed on Apr. 29, 2004.

(51) Int. Cl.
*E04B 2/00* (2006.01)
(52) U.S. Cl.
USPC .............................................. 52/386; 52/384
(58) Field of Classification Search
USPC ................... 52/513, 384, 385, 386, 387, 389;
405/262, 284, 286
See application file for complete search history.

(56) References Cited

U.S. PATENT DOCUMENTS

| 1,593,297 | A | * | 7/1926 | Gilmer .......................... 52/386 |
| 2,121,037 | A | | 6/1938 | Kotrbaty |
| 2,918,814 | A | | 1/1956 | Farina |
| 3,555,757 | A | | 1/1971 | Volent |
| 3,660,954 | A | | 5/1972 | Logan |
| 3,686,873 | A | | 8/1972 | Vidal |
| 3,895,469 | A | | 7/1975 | Kapitan |
| 3,950,908 | A | | 4/1976 | Van Eyk |
| 4,229,920 | A | | 10/1980 | Lount |
| 4,238,105 | A | | 12/1980 | West |
| 4,449,857 | A | | 5/1984 | Davis |
| 4,454,699 | A | | 6/1984 | Strobl |
| 4,470,728 | A | | 9/1984 | Broadbent |
| 4,545,703 | A | | 10/1985 | Boynton |
| 4,564,316 | A | | 1/1986 | Hunziker |
| 4,593,513 | A | | 6/1986 | Stratton |

(Continued)

FOREIGN PATENT DOCUMENTS

| CA | 2 526 876 A1 | 2/2006 |
| WO | WO 2005/108683 A1 | 11/2005 |
| WO | WO 2007/069027 A2 | 6/2007 |
| WO | WO 2008/092237 A1 | 8/2008 |

OTHER PUBLICATIONS

Oct. 5, 2005 Notification of Transmittal of the International Search Report and the Written Opinion of the International Searching Authority, or the Declaration in PCT/US2005/014769 (12 pages).

*Primary Examiner* — Sunil Singh
(74) *Attorney, Agent, or Firm* — Popovich, Wiles & O'Connell, P.A.

(57) ABSTRACT

A veneer panel system is used with a wall or a retaining wall to provide a natural stone appearance and/or to improve the appearance of an existing wall. Panels can be interlocked to form a stable veneer structure. The structure is attached to a wall by various attachment devices.

37 Claims, 20 Drawing Sheets

(56) References Cited

U.S. PATENT DOCUMENTS

| | | | |
|---|---|---|---|
| 4,661,023 A | 4/1987 | Hilfiker | |
| 4,684,287 A | 8/1987 | Wojciechowski | |
| 4,706,429 A | 11/1987 | Young | |
| 4,811,537 A * | 3/1989 | D'Epenoux | 52/385 |
| 4,884,382 A | 12/1989 | Horobin | |
| 4,884,921 A | 12/1989 | Smith | |
| 4,885,888 A | 12/1989 | Young | |
| 4,887,691 A | 12/1989 | Rotondo | |
| 4,894,969 A | 1/1990 | Horobin | |
| 4,913,594 A | 4/1990 | Sigourney | |
| 4,961,673 A * | 10/1990 | Pagano et al. | 405/287 |
| 4,967,532 A | 11/1990 | Castle et al. | |
| 4,993,879 A | 2/1991 | Hilfiker | |
| 5,101,600 A * | 4/1992 | Morris et al. | 451/513 |
| 5,138,809 A * | 8/1992 | Saikachi | 52/235 |
| 5,350,256 A * | 9/1994 | Hammer | 405/286 |
| 5,428,933 A | 7/1995 | Philippe | |
| 5,524,405 A | 6/1996 | Byrd | |
| 5,538,363 A | 7/1996 | Eastwood | |
| 5,551,810 A | 9/1996 | Franceski et al. | |
| 5,567,089 A | 10/1996 | Akamine | |
| 5,588,786 A | 12/1996 | House et al. | |
| 5,623,797 A | 4/1997 | Gravier et al. | |
| 5,735,643 A | 4/1998 | Castonguay et al. | |
| 5,788,423 A | 8/1998 | Perkins | |
| 5,823,717 A | 10/1998 | Bastick et al. | |
| D404,146 S | 1/1999 | Perkins | |
| 5,878,545 A | 3/1999 | Gebhart | |
| 5,930,964 A | 8/1999 | Boehning | |
| 5,934,035 A | 8/1999 | Rasmussen et al. | |
| 6,024,516 A | 2/2000 | Taylor et al. | |
| 6,062,772 A | 5/2000 | Perkins | |
| 6,070,380 A | 6/2000 | Meilleur | |
| 6,176,049 B1 | 1/2001 | Crant et al. | |
| 6,230,462 B1 | 5/2001 | Beliveau | |
| 6,314,697 B1 | 11/2001 | Moore, Jr. | |
| 6,318,040 B1 | 11/2001 | Moore, Jr. | |
| 6,363,683 B1 | 4/2002 | Moore, Jr. | |
| 6,374,556 B2 | 4/2002 | Crant et al. | |
| 6,401,419 B1 | 6/2002 | Beliveau | |
| 6,443,666 B1 | 9/2002 | Smith | |
| 6,523,312 B2 | 2/2003 | Budge | |
| 6,526,713 B2 | 3/2003 | Moore, Jr. | |
| 6,536,172 B1 | 3/2003 | Amend | |
| 6,578,338 B1 | 6/2003 | Nanayakkara | |
| 6,607,683 B1 | 8/2003 | Harrington | |
| 6,668,502 B2 | 12/2003 | Beliveau | |
| 6,668,503 B2 | 12/2003 | Beliveau | |
| 6,708,459 B2 | 3/2004 | Bodnar | |
| 6,758,636 B2 | 7/2004 | Rainey et al. | |
| 6,792,729 B2 | 9/2004 | Beliveau | |
| 6,820,384 B1 | 11/2004 | Pfeiffer | |
| 6,827,527 B2 | 12/2004 | Conkel et al. | |
| 6,848,228 B1 | 2/2005 | Williams | |
| 6,978,581 B1 | 12/2005 | Spakousky | |
| 6,990,774 B2 | 1/2006 | Clapp | |
| 7,032,357 B2 | 4/2006 | Cooper et al. | |
| 7,082,731 B2 | 8/2006 | Patz et al. | |
| 7,082,732 B2 | 8/2006 | Titishov | |
| 7,121,051 B2 | 10/2006 | Hunsaker | |
| 7,165,374 B2 | 1/2007 | Chanesian | |
| 7,165,916 B2 | 1/2007 | Nanayakkara | |
| 7,235,204 B2 | 6/2007 | Harrington | |
| 2001/0027630 A1 | 10/2001 | Moore, Jr. et al. | |
| 2002/0078649 A1 | 6/2002 | Clapp | |
| 2005/0204679 A1 | 9/2005 | Pfeiffer | |
| 2005/0204699 A1 | 9/2005 | Rue | |
| 2005/0242468 A1 | 11/2005 | MacDonald et al. | |
| 2005/0252144 A1 | 11/2005 | MacDonald et al. | |
| 2005/0252145 A1 | 11/2005 | MacDonald et al. | |
| 2005/0252146 A1 | 11/2005 | MacDonald et al. | |
| 2005/0252147 A1 | 11/2005 | MacDonald et al. | |
| 2006/0197257 A1 | 9/2006 | Burt et al. | |
| 2006/0260240 A1 | 11/2006 | Patz et al. | |
| 2006/0263575 A1 | 11/2006 | Ritchie | |
| 2007/0044426 A1 | 3/2007 | Deans | |
| 2008/0289282 A1 | 11/2008 | MacDonald | |
| 2009/0013638 A1 | 1/2009 | Clarno | |

* cited by examiner

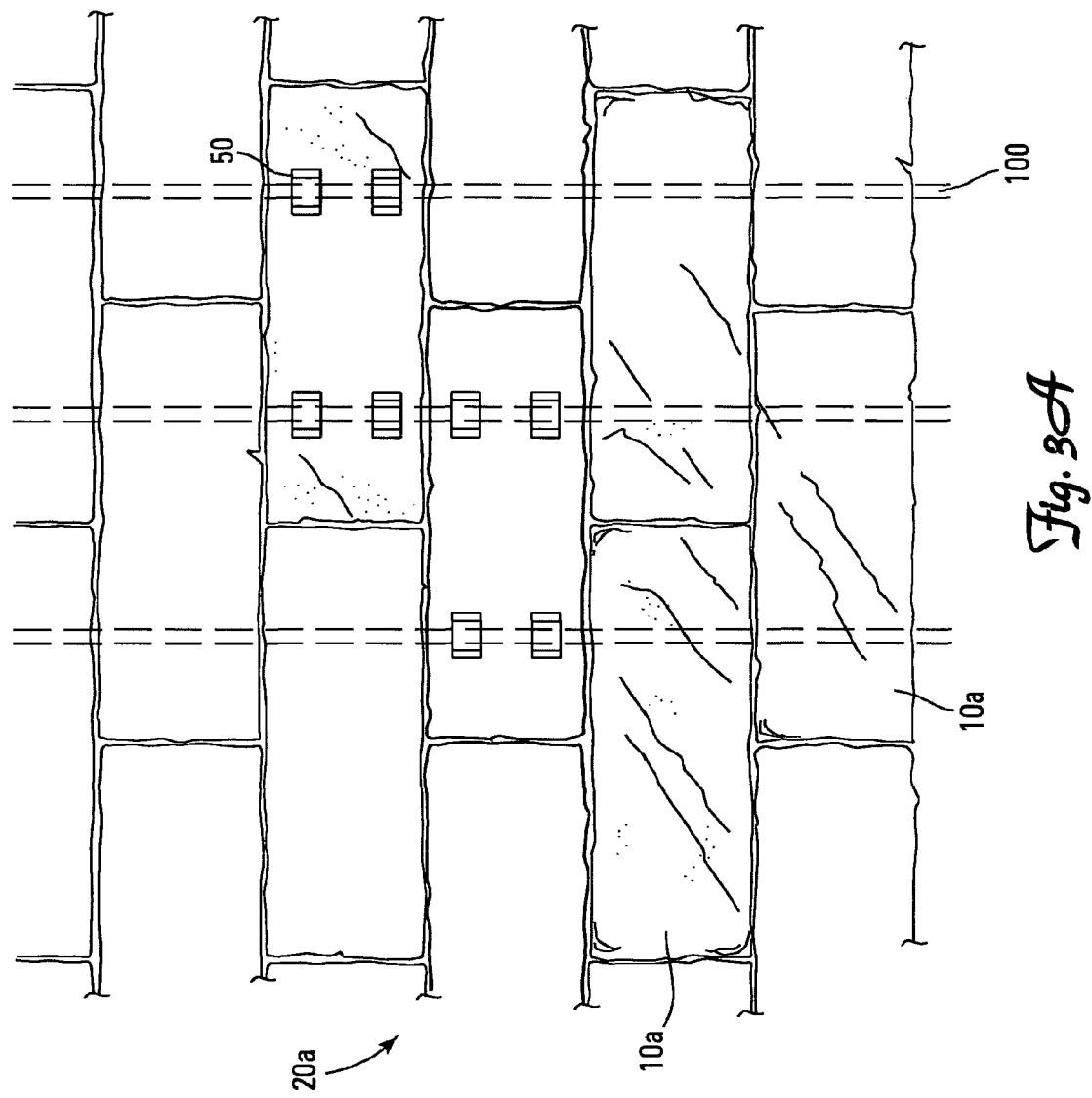

VENEERS FOR WALLS, RETAINING WALLS AND THE LIKE

This application is a continuation of U.S. Ser. No. 11/117,077, filed Apr. 28, 2005, now abandoned, which claims the benefit of U.S. Provisional Application No. 60/566,616, filed Apr. 29, 2004, the contents of each of which are hereby incorporated by reference herein.

FIELD OF THE INVENTION

This invention relates to walls and retaining walls and in particular relates to a veneer panel system to form a decorative and protective face for such walls either during construction of the wall or after the wall has already been installed.

BACKGROUND OF THE INVENTION

Retaining walls are used in various landscaping projects and are available in a wide variety of styles. Numerous methods and materials exist for the construction of retaining walls. Such methods include the use of natural stone, poured concrete, precast panels, masonry, and landscape timbers or railroad ties.

A widely accepted method of construction of such walls is to dry stack concrete wall units, or blocks. These blocks are popular because they are mass produced and, consequently, relatively inexpensive. They are structurally sound, easy and relatively inexpensive to install. Because they comprise concrete, they are durable. They can be given a desired appearance, such as, for example, natural stone. Many block systems also use pins that are adapted to fit in corresponding pin holes in adjacent blocks or may use other mechanical means to contribute to the stability of a wall.

Typically, retaining wall blocks are manufactured to have the desired appearance on the front face (i.e., the outer face of a wall) because only the front is visible after the wall is constructed. It is highly desirable to have the front face of the wall system have a natural stone appearance, and many approaches are used in the art to treat or process concrete to evoke the appearance of natural stone, including splitting the block, tumbling the block to weather the face and edges of the face, and using processing or texturing equipment to impart a weathered look to the concrete.

Depending upon their location, the soil type, the amount of water that can flow through the wall, and the mineral content of the water, an undesirable appearance can develop on the surface of a retaining wall. In addition, due to exposure to the elements and freeze/thaw cycles, concrete retaining walls may exhibit spalling, that is, chipping and cracking of concrete, which affects their appearance and can ultimately affect their utility. Freeze-thaw effects are worsened when the wall face is exposed to salt spray, which commonly occurs on roadways where de-icing salts are used to clear the road of ice and snow. Efflorescence refers to the leaching of mineral salts from water and this often occurs on walls in contact with water. The resultant deposit on a surface creates an unattractive white stained appearance on a wall.

There have been prior efforts to veneer segmental retaining walls with natural stone or concrete that is molded to closely resemble natural stone. While such veneering produces aesthetically pleasing walls, it is a laborious and highly expensive process, as it requires skilled masonry work to tie in the stone or concrete veneer to the wall using traditional mortared masonry construction methods. Such veneering can double the cost of the finished wall. In addition, segmental retaining walls are not rigid structures and applying a rigid mortared veneer may cause cracking unless appropriate steps are taken to provide slip joints.

Accordingly, it would be desirable to provide a retaining wall system that would be easy to install, that would possess an appearance that closely resembles natural stone and that would keep its desirable appearance indefinitely. Another need in the art is a way to improve the appearance of surface-damaged or stained retaining walls.

Many retaining wall systems described in the art include the use of reinforcing materials, also referred to as geogrids, geosynthetic reinforcement, or geogrid soil reinforcement. These terms sometimes are used interchangeably, and "geogrid" as used herein is intended as a generic term. Reinforcement materials may be inextensible, such as steel mesh, or extensible geosynthetic materials, such as mats and oriented polymeric materials. For example, flat polymeric sheets are used to form geogrids by forming holes in the sheets and then drawing them to orient the polymer and increase the modulus. Such polymeric materials include high density polyethylene (HDPE) and these materials form relatively stiff geogrids commercially available under the trade designation "TENSAR".

While the HDPE materials are relatively stiff, a second type of geosynthetic material is composed of a mat typically formed from polyester fibers that are woven or knitted. These may comprise rectilinear polymer constructions characterized by large (e.g., 1 inch (2.5 cm) or greater) openings. In these open structure geogrids, polymeric strands are woven, knitted or "welded" (by means of adhesives and/or heat) together in a grid. Polymers used for making relatively flexible geogrids include polyester fibers. The polyester typically is coated, commonly using a polyvinyl chloride (PVC) or a latex topcoat. The coating may contain carbon black for ultraviolet (UV) stabilization. Some open structure geogrids comprise polyester yarn for the warp fibers and polypropylene as the fill fibers.

Another flexible reinforcing geosynthetic material is fabric, i.e., woven or non-woven constructions without large openings. These fabrics typically comprise polymers and may be referred to as geofabrics. The geofabric can be laid between courses of blocks in a wall, and typically is tied into the wall and held there. When blocks are configured to have pin connectors, for example, a hole or slit is formed in the geofabric at the construction site and the geofabric is held on the blocks by fitting it over the pins.

In common use, the geogrid extends behind the retaining wall and ties into the earth behind the wall, thus creating a cohesive soil mass tied into the wall facing that resists overturning. Geogrids are either mechanically connected to a course of blocks or rely on the friction created by placing the geogrids layer between courses of blocks. When the mode of connection is friction alone, the geogrid is placed on top of a course of blocks, and then a succeeding layer of blocks is placed on top of the geogrid. When the connection is mechanical, after placement of a course of blocks to the desired height, geogrid is placed onto a course of blocks and held in place by means of pins in the block (which may have a primary function of aligning and holding blocks together) or by means of special connectors. Flexible geogrid is put under tension by pulling back and staking the geogrid behind the retaining wall. Backfill is placed and compacted over the geogrid. Construction of the wall continues and may include additional layers of geogrid.

Such systems have proven reliable in many wall applications. There are limits to their performance however, particularly at the upper portions of the wall, where the load of the blocks above the geogrids layer do not provide as much load on the connection, so that frictional forces are reduced. The use of frictional connections forces the wall designer and builder to use more and higher strength geogrids because connection strength limits the strength of the system, and this adds expense to the wall. Mechanical connectors attempt to overcome this limitation by mechanically connecting the geogrids to the wall facing in a way that is not load dependent. The difficulty with this approach is that in order for such connectors to provide high levels of efficient connection they must add considerable expense to cost of using the geogrids reinforcement, and add complexity and expense to the installation process. Thus there are shortcomings to both approaches.

There are also many wall applications in seismic zones where providing an extra measure of protection against loss of connection between the wall facing and the reinforcing geogrids during a seismic event would be highly desirable. Thus there is a need for a geogrid connection system that is not load dependent, that does not add significant expense to the construction of the wall, and that is highly reliable and resistant to failure during seismic conditions.

SUMMARY OF THE INVENTION

We have invented a veneer panel system that can be used with a wall or a retaining wall to provide a variety of desired appearances, including an appearance that closely resembles a variety of natural stone types and to improve the appearance of the front face of an existing wall. Individual panels form a veneer for the wall; the panels preferably are interlocked to form a stable veneer structure. This structure is attached to a wall by various attachment means. This system also permits a cost effective maximum positive connection of geogrid with blocks or units comprising the retaining wall while providing the desired appearance.

BRIEF DESCRIPTION OF THE SEVERAL VIEWS OF THE DRAWING

FIG. 3A is a front view of a portion of a veneer panel system having a running bond pattern and FIG. 3B is a view of a portion of a veneer panel system having a stacked bond pattern.

DETAILED DESCRIPTION OF THE PREFERRED EMBODIMENTS

Figure 1A:
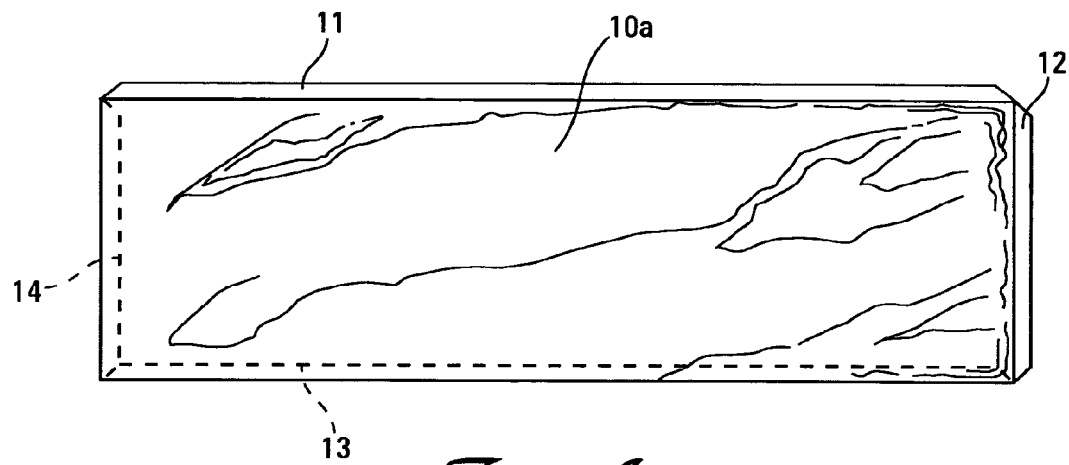
FIG. 1A is a front view of a panel of this invention and FIG. 1B is a back view of a panel of this invention.

In this application, wall refers to structures comprising natural stone, poured concrete, precast panels, masonry, landscape timbers or railroad ties, and retaining wall blocks. Panels having a desired appearance are used as a veneer by attaching the panels to the exposed surfaces of a wall.

In a preferred embodiment, the panels of this invention are used with retaining walls, and in a most preferred embodiment, the retaining walls comprise blocks. The blocks are made of a rugged, weather resistant material, preferably (and typically) zero-slump molded concrete. Other suitable materials include plastic, reinforced fibers, wood, metal and stone. The blocks may have various shapes and characteristics, as known in the art, and may be stacked one upon the other to provide a straight wall, and also may be stacked so that they are angled from vertical. As known in the art, the blocks may be connected to each other by a pin attachment system, or the blocks may be provided with one or more protruding elements that interlock with one or more corresponding recesses in an adjacent block.

"Upper" and "lower" refer to the placement of the block in a retaining wall. The lower, or bottom, surface is placed such that it faces the ground. In a retaining wall, one row of blocks is laid down, forming a course. An upper course is formed on top of this lower course by positioning the lower surface of one block on the upper surface of another block.

Retaining walls may be straight (i.e., substantially linear, as well as vertically straight), curved (serpentine) or may have sharp corners (i.e., 90 degree angles). Such walls can be angled from vertical. In this invention, reinforcing geogrid tie-backs or geosynthetic fabrics (also referred to generally as geogrids and geotextiles) may be used with retaining wall blocks. Regardless of the type of retaining wall, the veneer panel system should be easy to install, structurally sound, and meet or exceed all ASTM, IBC, and AASHTO requirements for retaining wall structures.

The veneer of this invention preferably comprises a mineral aggregate in fiberglass. This material is produced by mixing stone particles, sand, or mineral with resin, pouring this into a mold. Typically, particles of the type of stone that the panel is meant to resemble are used in the resin mixture, and these particles provide the color for the panel. For example, if the panel is intended to resemble natural granite, then granite particles are used in the mix. If limestone is the desired look, then fine particles of limestone may be used. Various powdered pigments may be added to the mix in order to create different colors or shades of color. The mold is configured to impart a surface texture to the material that resembles the texture of natural stone. After the mineral resin mix is added and spread across the mold, a mixture of glass fibers and resin is added into the mold. At this stage, structural components used to attach the panels to the surface that is being veneered may be added. Such components may be formed of pultruded fiberglass, and may be attached to the panel during the curing process in order to create a bond between the fiberglass panel and the structural component. After the resin has cured, the front surface of the panel preferably is sandblasted to remove resin from the surface, thus revealing a naturally-appearing mineral or stone surface. Alternatively, the front surface may by polished in order to produce a polished stone look.

It is to be emphasized that the surface of a panel may have any desired appearance. A natural appearance, such as stone, is generally most desirable. The panel may have a uniform appearance or it may have an ashlar pattern formed into it. The panels may also resemble stone that has been processed or treated as is commonly known in the natural stone industry. For example, the panel may resemble a weathered stone, polished stone, or flame treated stone. In addition, the mold may be configured to produce panels that resemble stone that has been hand or machine pitched or tumbled to produce an aesthetically pleasing natural quarried stone appearance.

The panels are produced in dimensions that are convenient to manufacture and handle. The panels may be planar but preferably have a slight curve molded at the edges so as to be used with various connecting elements, as described further below. Convenient panel sizes are about 8×18 inches (20.5 cm×45.7 cm), 16×48 inches (40.6×121.9 cm), and 32×48 inches (81.3×121.9 cm). The dimensions of the panel may vary from these stated dimensions in order to meet aesthetic or functional requirements of particular applications. These panels are relatively light in weight when compared to panels of granite. For example, a granite panel may weigh 400 to 500% more than a similarly sized panel of the present invention.

The back of the panel is provided with an attachment means so that the panel can be affixed to a wall. The resin/fiberglass composition of the panels allows a desired attachment means to be molded into the panel when it is formed, attached by adhesive, or attached by mechanical means such as screws and bolts. Attachment means include hooks, brackets, connection joints, connection channels, and the like. Preferred attachment mechanisms are described further below.

To create a veneer panel, several panels are installed next to each other over a wall. In a preferred embodiment, the panels are provided with tongue and groove attachment means so that two adjacent panels can be connected to each other. Preferably, each panel has two adjacent sides with a groove adapted to receive a tongue from corresponding sides of adjacent panels. Preferably, the attachment means provide a joint that discourages or minimizes penetration of water from rain or roadway spray. To attach a panel to the wall, a bracket, hook, connection joint or channel is molded into the back of the panel when it is manufactured. This then can be used to attach the panel to the wall by means of screws, bolts, pins, wire, nylon connectors or strapping or railings. Alternatively, and preferably, an interlocking element is molded onto the back of a panel when it is manufactured. This interlocking element mates with a corresponding interlocking element on the wall. The attachment means for the veneer panel preferably provides for flexibility when positioning the panels a distance from the wall. Because of irregularities in the underlying wall surface, it may be necessary or desirable to position the panels at various distances from a wall, and to allow for lateral positioning of the attachment means to accommodate curvature in the wall.

The panel of this invention is impervious to water and salt spray, is resistant to freeze-thaw degradation and UV degradation, and is relatively light in weight. As a result of these properties, the panel of this invention provides not only greater beauty, but enhances the durability of the underlying wall structure, since most concrete products become more vulnerable to freeze-thaw deterioration when salt water and freezing conditions are both present. After a panel wall has been installed, individual panels can be replaced if desired, which is a cost advantage if a portion of the surface of a wall has been damaged. The panels also are formed of a material that discourages graffiti since it has an irregular surface, and from which graffiti may be removed more readily since it does not absorb spray paint as readily as concrete. Use of the panels conceals any aesthetic problems with the wall, such as staining from red clay soils or from efflorescence.

The panels are useful when a wall is constructed from retaining wall blocks when it is desired to use a geogrid and to produce a simple, cost-effective and highly efficient connection between the geogrid and the wall. That is, because the wall surface will be concealed by the panels, the geogrid can be wrapped around the blocks, extending behind the blocks into the earth behind the wall. Thus the geogrid is in contact between the entire surfaces of adjacent blocks, as shown in FIGS. 9 to 12. Preferably, fabric is placed where the geogrid exits and re-enters the front face of the blocks to eliminate abrasion of the geogrid by the edges of the concrete block. Any cost-effective and suitably durable fabric of sheet material may be used for this purpose, including woven or non-woven polyester fabric, vinyl sheeting, or plastic sheeting. The connection system may use a variety of geogrids or geofabrics for soil reinforcement.

Installation of the geogrid reinforcement of the present invention is accomplished by laying out the geogrid at the desired height on top of the course of block, but extra geogrid is provided at the face of the wall in a sufficient quantity that after succeeding courses of block are placed and backfilled, the geogrid may be pulled up over the succeeding courses and then laid back into the reinforced zone. The number of succeeding courses between geogrid layers is a function of products and the design principles used, but spacing of two or three courses is common. A protective fabric or sheet is placed between the geogrid and the block above and below the geogrid in order to protect the geogrid from abrasion. The geogrid may be placed in uniform lengths, or may be in different lengths if the wall design calls for the use of intermediate reinforcing using shorter reinforcement lengths between longer lengths.

As a result of the present invention, the geogrid completely encloses the blocks. This provides a highly efficient connection system that adds minimal cost to the wall structure when compared to existing solutions. It provides greater structural integrity to the finished wall, which is highly desirable in critical applications, and certainly in seismic zones.

Turning now to the Figures, the veneer panel system of this invention is shown and described.

Figure 1B:
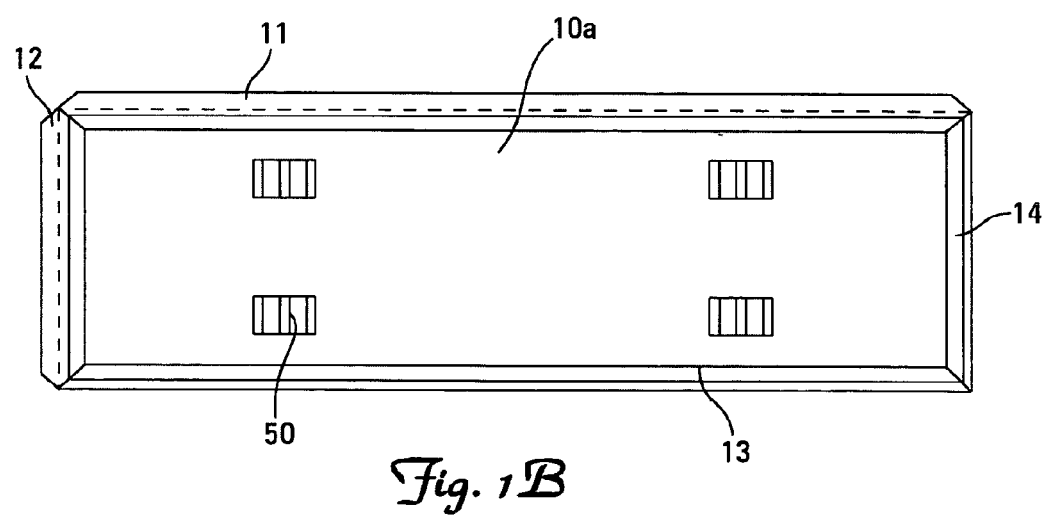
Figure 2A:
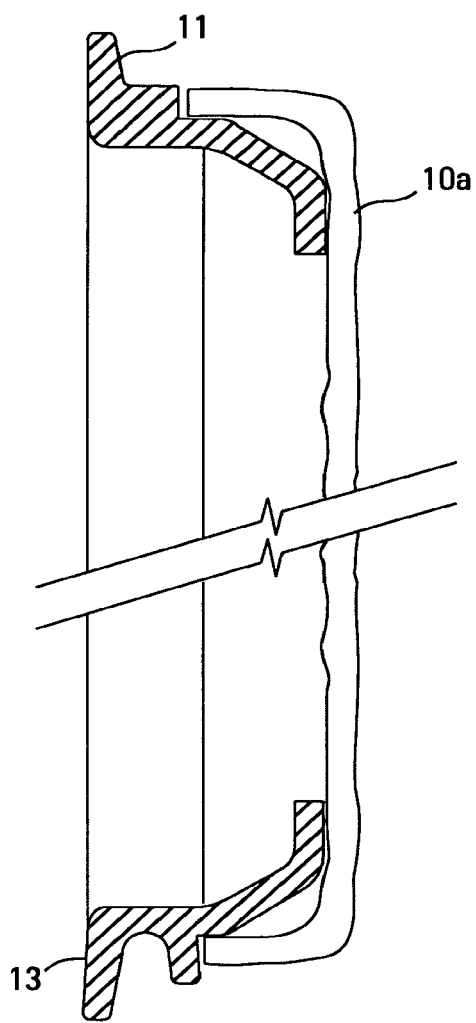
FIG. 2A is a side view of a panel of this invention with tongue and groove connectors and FIG. 2B is a partial side view of two panels showing the detail of the tongue and groove connection.
Figure 2B:
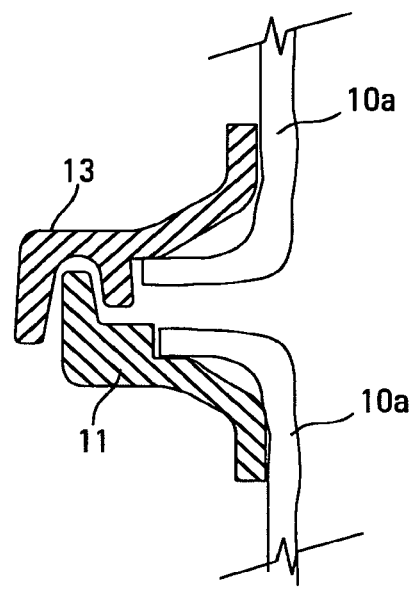

FIGS. 1 and 2 illustrate a preferred embodiment of the panel of this invention, in which the panels are provided with interlocking tongue and groove elements. The tongue and groove elements are shown extending the full length of the side to which they are attached, however, it is to be understood that the tongue and groove elements could extend over only a portion of the side of a panel. The tongue and groove elements, as well as adaptors 50, are molded into the back of the panels during manufacture by setting the elements into resin before it is cured. FIGS. 1A and 1B show panel 10a having curvilinear edges with tongues 11 and 12 along two adjacent sides and grooves 13 and 14 (shown in phantom) along the other two sides. FIG. 2A shows tongue element 11 and groove element 13 on the back of one panel and FIG. 2B shows how two of the panels are connected together by these elements.

Figure 3B:
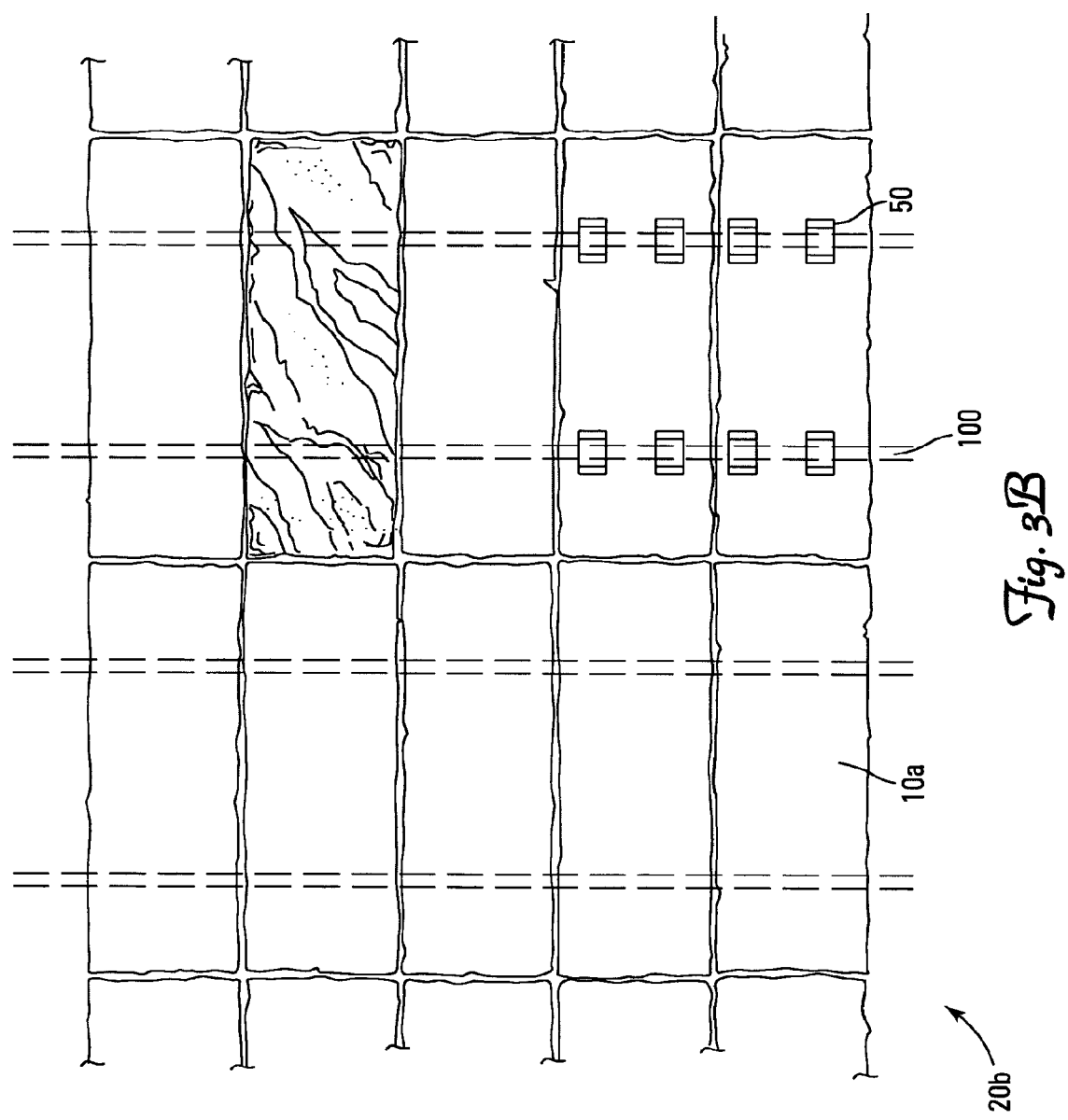
Figure 4:
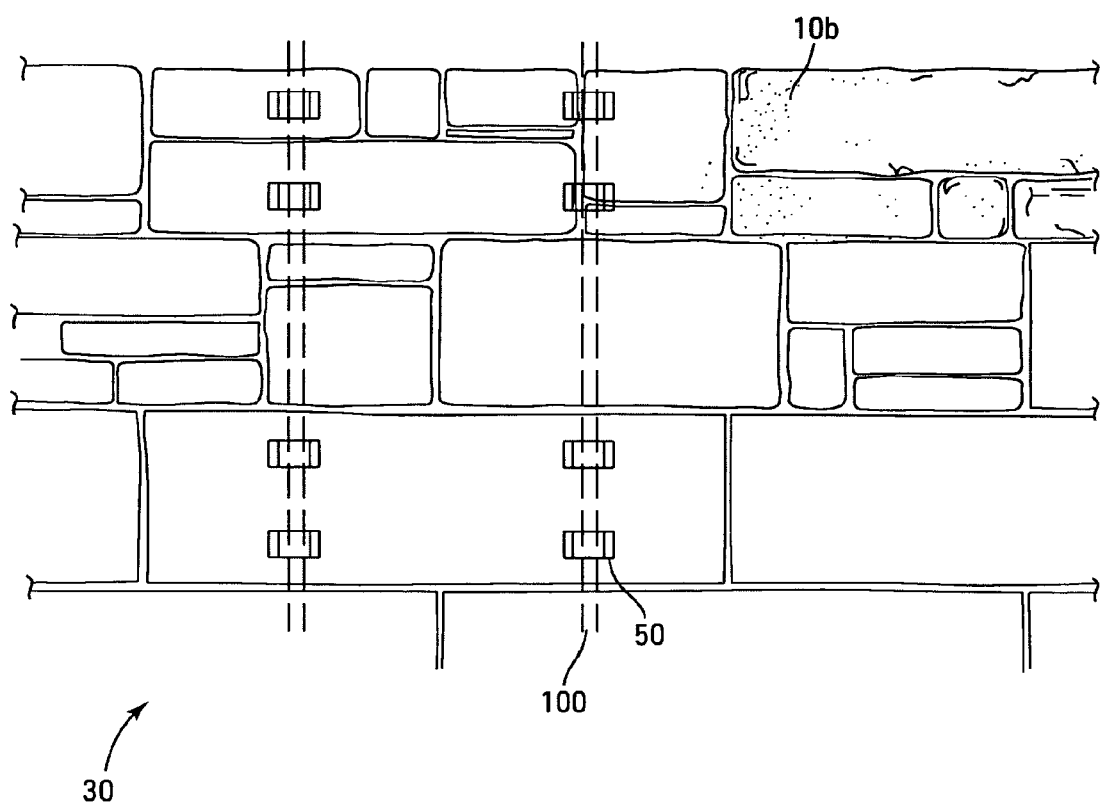
FIG. 4 is a front view of a portion of a veneer panel system wherein panels have various patterns.

FIG. 3A shows veneer panel system 20a wherein panels 10a are arranged in a running bond pattern over the surface of a wall. FIG. 3B shows veneer panel system 20b wherein panels 10a are stacked. FIG. 4 shows another veneer panel system 30 wherein some panels (10b) have an ashlar appearance. The attachment means, shown in phantom, comprises adaptors 50 molded onto the backs of the panels and rails 100 attached to the wall by means of brackets. For simplicity, not all attachment means are shown.

Figure 5A:
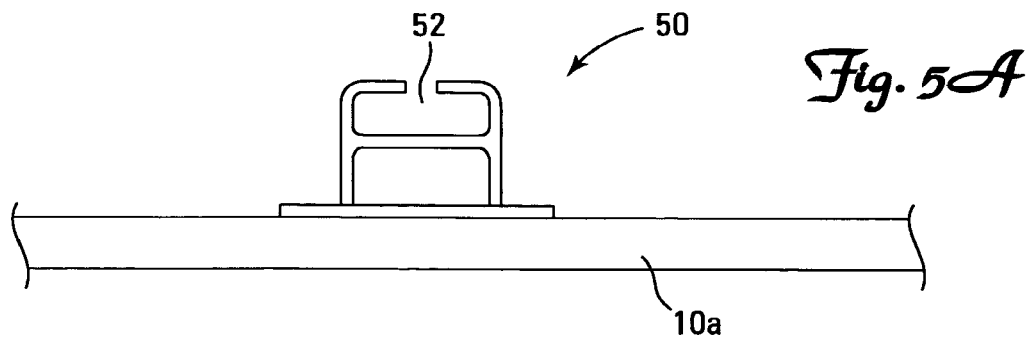
FIG. 5A is a top view of an adaptor of this invention.
Figure 5B:
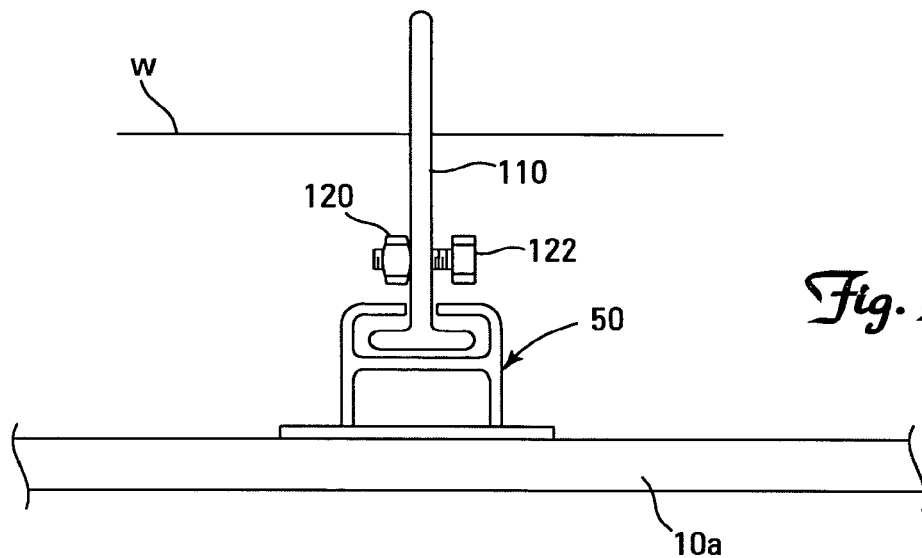
FIG. 5B is a top view of the adaptor interlocked with a rail.
Figure 5C:
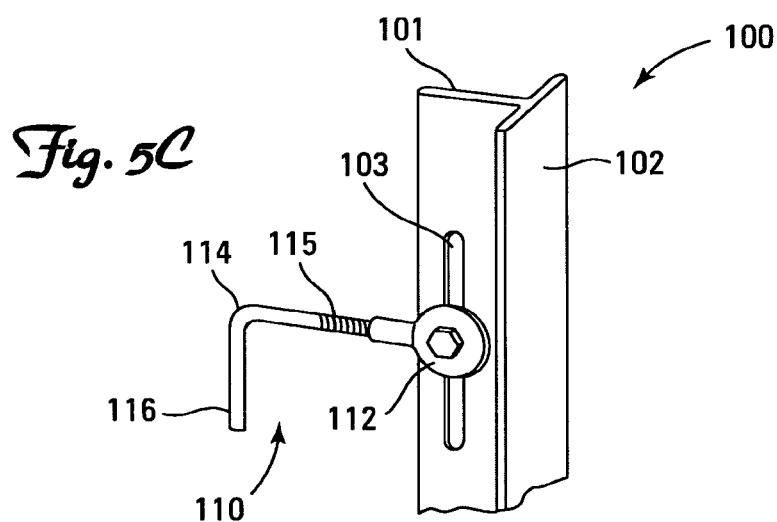
FIG. 5C is a partial perspective view of a rail and its attachment.

FIGS. 5A to 5C illustrate how the panel system is attached to a wall. Rail 100 has a T-shape with body portion 101 and T-section 102. Adaptor 50 with channel 52 fits over T-section 102 on rail 100. Body portion 101 attaches to wall W by means of a connector, such as a bracket, though the body portion can be attached by any suitable means. Rail 100 has one or more slots or holes 103 to which bracket 110 is attached and held secure through eyelet 112 by means of nut 120 and bolt 122. Preferably, the distance of the rail from the wall can be varied. This permits an installer to produce an even or straight appearance for a wall which otherwise would have an irregular surface appearance, as happens occasionally in older walls that have experienced settling. The preferred way to adjust this distance from the wall is provided by screw threads 115 on segment 114 of the bracket 110, on which eyelet 112 is adjustably mounted. Thus eyelet 112 can be positioned a desired distance away from the wall. Segment 116 is perpendicular to segment 114 and extends into the wall.

Figure 6A:
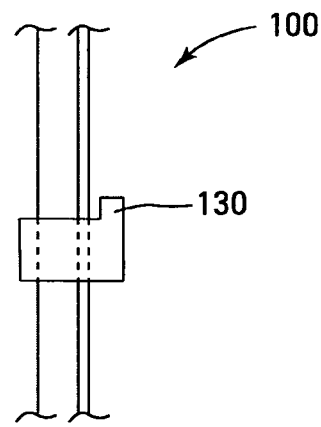
FIG. 6A is a side view of a hanging bracket.
Figure 6B:
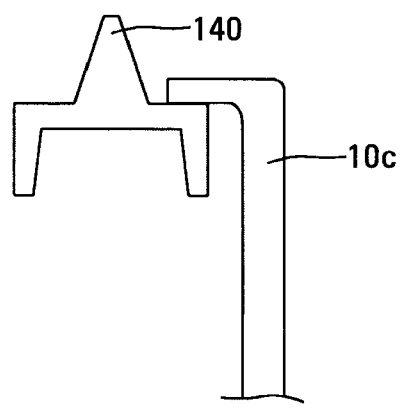
FIG. 6B is a side view of hanging element.
Figure 6C:
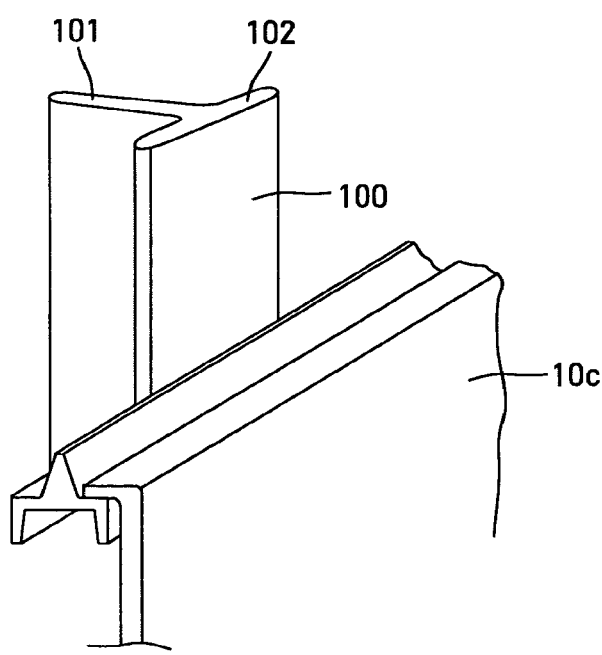
FIG. 6C is a perspective view of a panel hung from a rail.

FIGS. 6A to 6C illustrate that rail 100 with T-section 102 can be used with another style of bracket. Hanging bracket 130 is formed onto rail 100 and is designed so that it interlocks with hanging element 140 molded to the top edge of panel 10c.

Figure 7A:
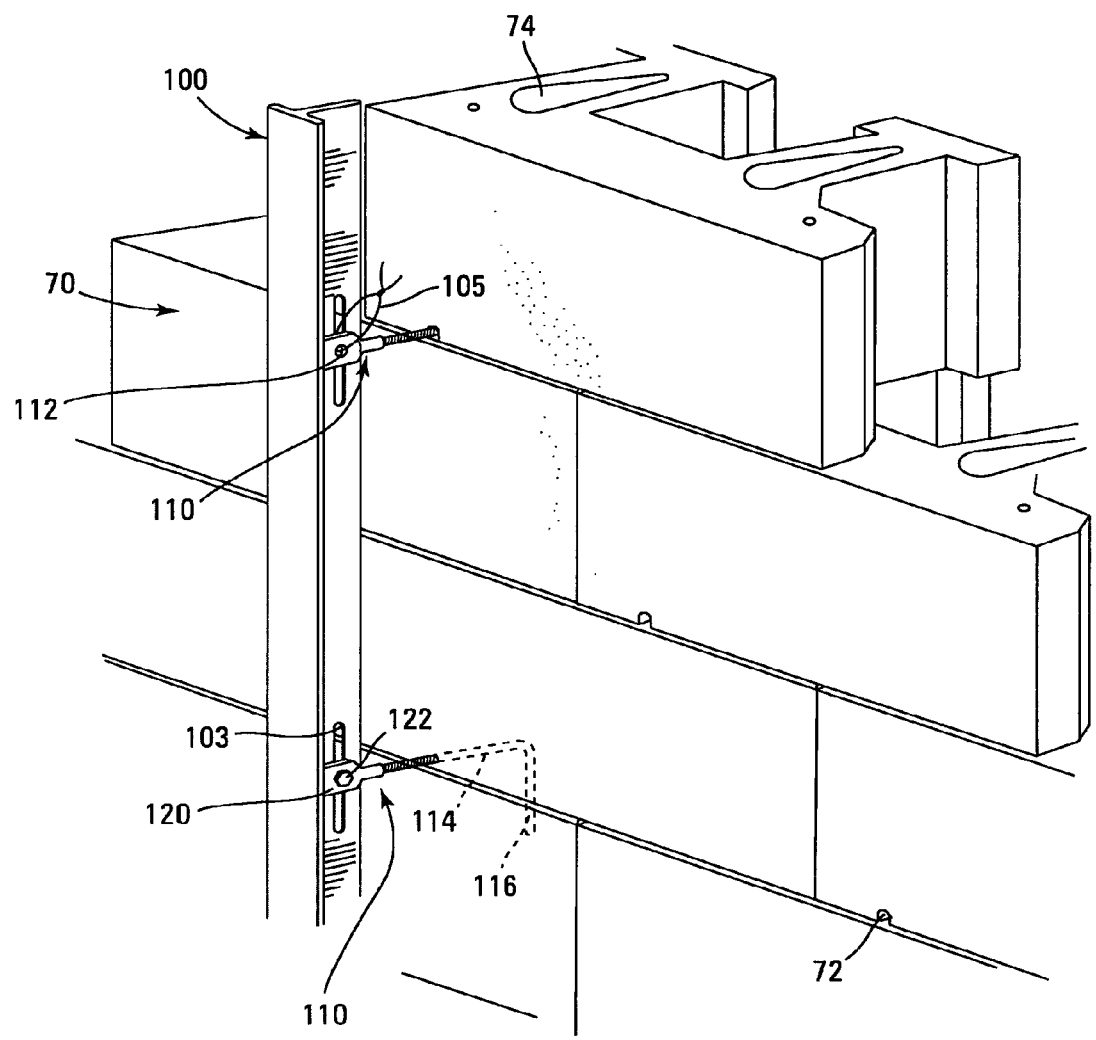
FIG. 7A is a partial perspective view of a rail attached to a wall and FIG. 7B is a partial perspective view showing the bracket attachment to a wall.

FIG. 7A shows a portion of a retaining block wall comprising retaining wall blocks such as those described in commonly assigned, co-pending application U.S. Ser. No. 10/754,454, filed Jan. 9, 2004, hereby incorporated herein by reference. Blocks 70 are provided with channel 72 so that bracket 110 can fit between blocks. Rail 100 is provided with one or more slots 103, which are sufficiently long to provide considerable flexibility in the vertical placement of the rail relative to the wall. Wire 105 feeds through eyelet 112 of bracket 110 (near the top of FIG. 7A). Bolt 120 and nut 122 attach the bracket to the rail (near the bottom of FIG. 7A).

Figure 7B:
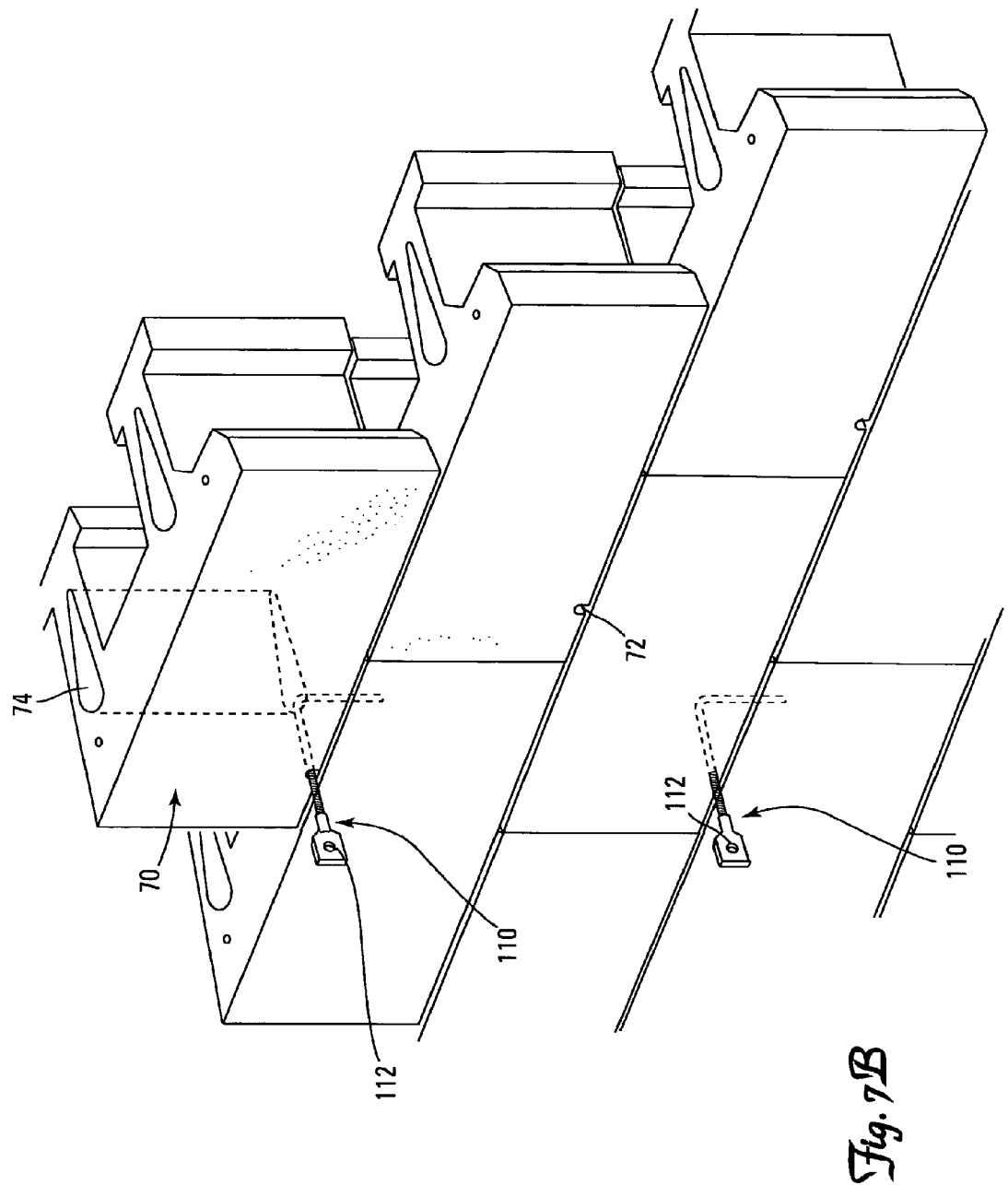

FIG. 7B illustrates further how segment 114 (shown partially in phantom) of bracket 110 fits between the blocks in channel 72. Segment 116 of the bracket extends into a cavity or core (such as core 74) of the block, thus being positioned next to the block and held securely.

Figure 8A:
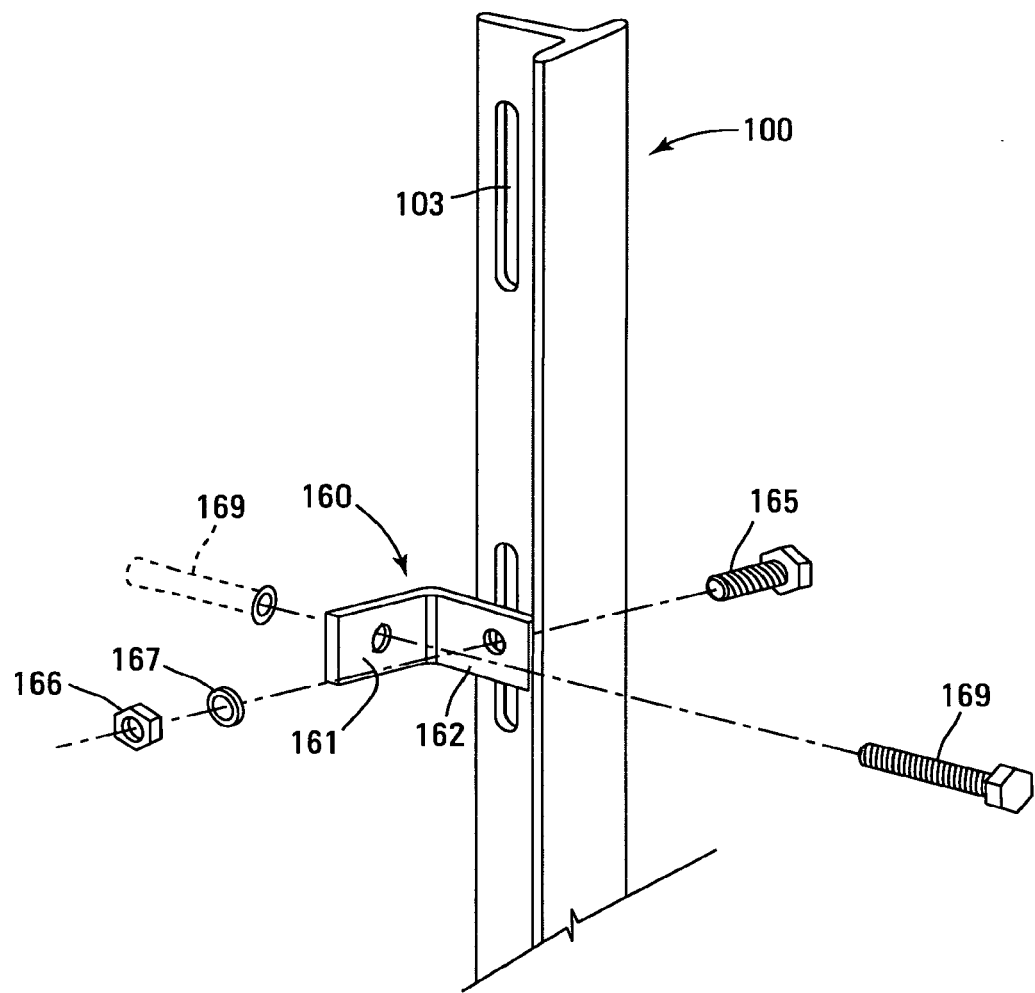
FIG. 8A is a perspective view of a rail showing attachment by an L-bracket and FIG. 8B is a top view of a portion of a wall having a rail attached by an L-bracket.
Figure 8B:
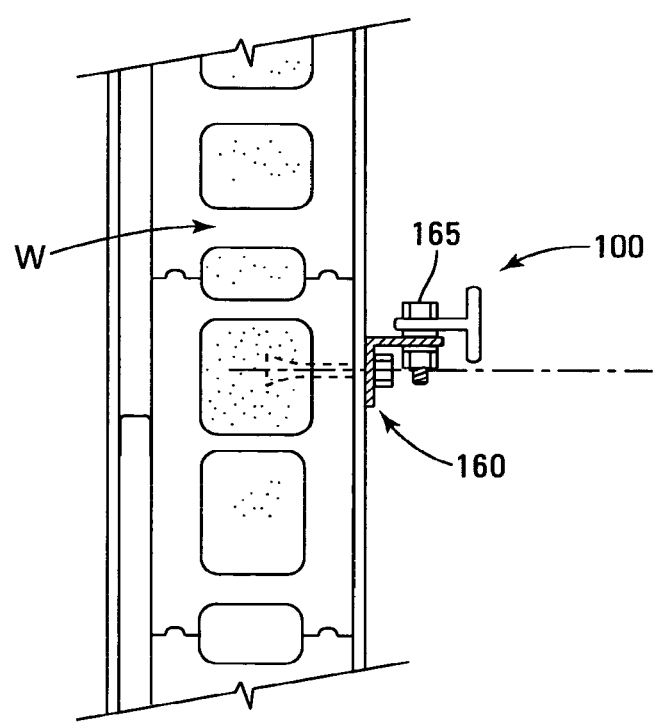

FIGS. 8A and 8B illustrate that an L-shaped bracket suitable to attach a rail to masonry wall W. Rail 100 is provided with one or more slots 103 (two slots are shown in FIG. 8A). L-angle bracket 160 has two sections 161 and 162 provided with a bore through which can be threaded bolts. Bolt 165 is held secure through section 162 by nut 166 and washer 167. A second bolt 169 threads through the bore in section 161, thus bolting the rail into the wall. A panel can then be attached to the rail as described above.

Figure 9:
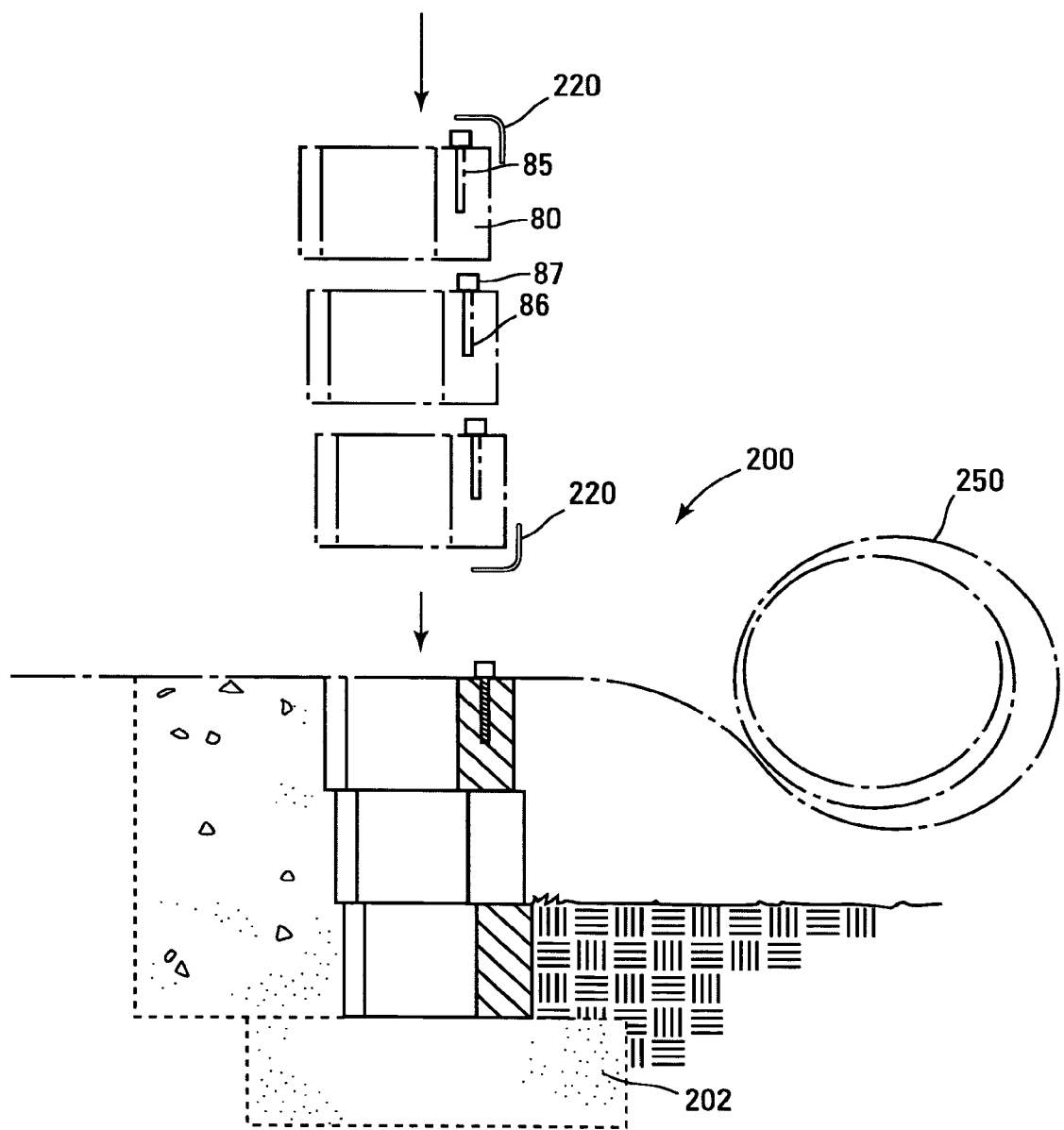
FIG. 9 is a sectional view of a retaining wall block system showing the placement of one layer of geogrid.

FIG. 9 shows an exploded side view of three of blocks 80 that use a pin attachment system. Pin 85 has straight portion or shank 86 that fits into a pin hole (shown in phantom) and head 87 that extends above the surface of the block and into a recess in the block above. In this way, the pins stabilize the wall.

Similar blocks are used to form three courses of blocks, slightly set back from one another. FIG. 9 illustrates the construction of retaining wall 200 wherein blocks 80 are laid onto a base leveling pad 202. The bottom block is placed below grade. Behind the blocks is placed drainage rock. When using retaining wall blocks with geogrid 250, a concern is that the edges of the blocks can abrade the geogrid. To prevent this, the edge of a course of blocks is provided with shield 220 to protect the geogrid from abrasion. Shield 220 comprises any suitable abrasion resistant material, such as vinyl, aluminum, steel, and the like, and is shaped to fit over the edge of course of blocks. Geogrid 250 is laid over the drainage rock and over the top (i.e., third) course of blocks.

Figure 10:
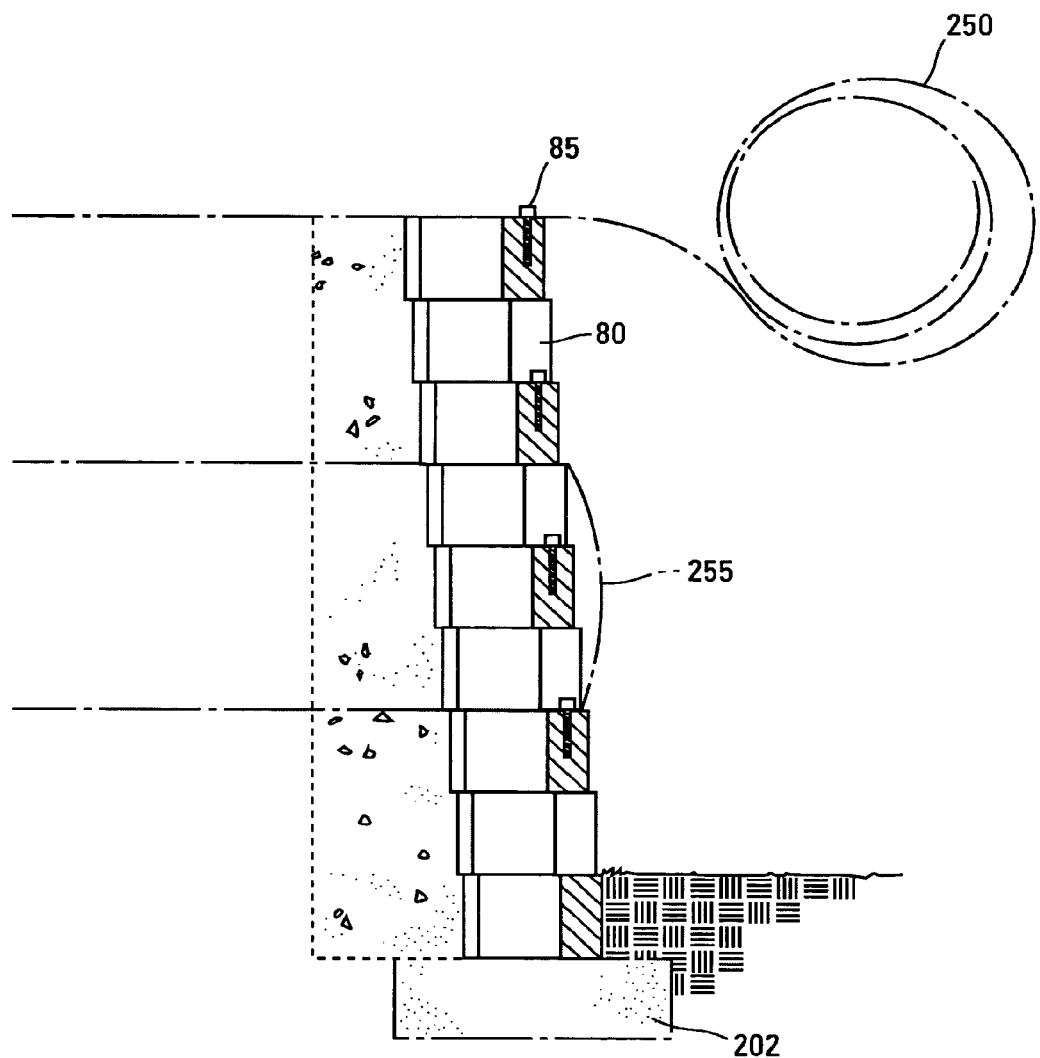
FIG. 10 is a sectional view of a retaining wall block system with geogrid wrapped around three courses of blocks.

Then, as shown in FIG. 10, three more courses of blocks are laid down. Soil is moved in behind the blocks and compacted. The geogrid then is laid over the top course of blocks, extending behind the wall, wrapping around three courses of blocks, thus forming geogrid wrap 255. The geogrid is securely held in place after three more courses of blocks are laid down. The placement of geogrid wrap 255 in front of the retaining wall is exaggerated in FIG. 10 in order to see it clearly. In use, it would be held close to the surface of the wall. FIG. 10 also illustrates the positioning of second geogrid 250 over the topmost course of blocks.

Figure 11:
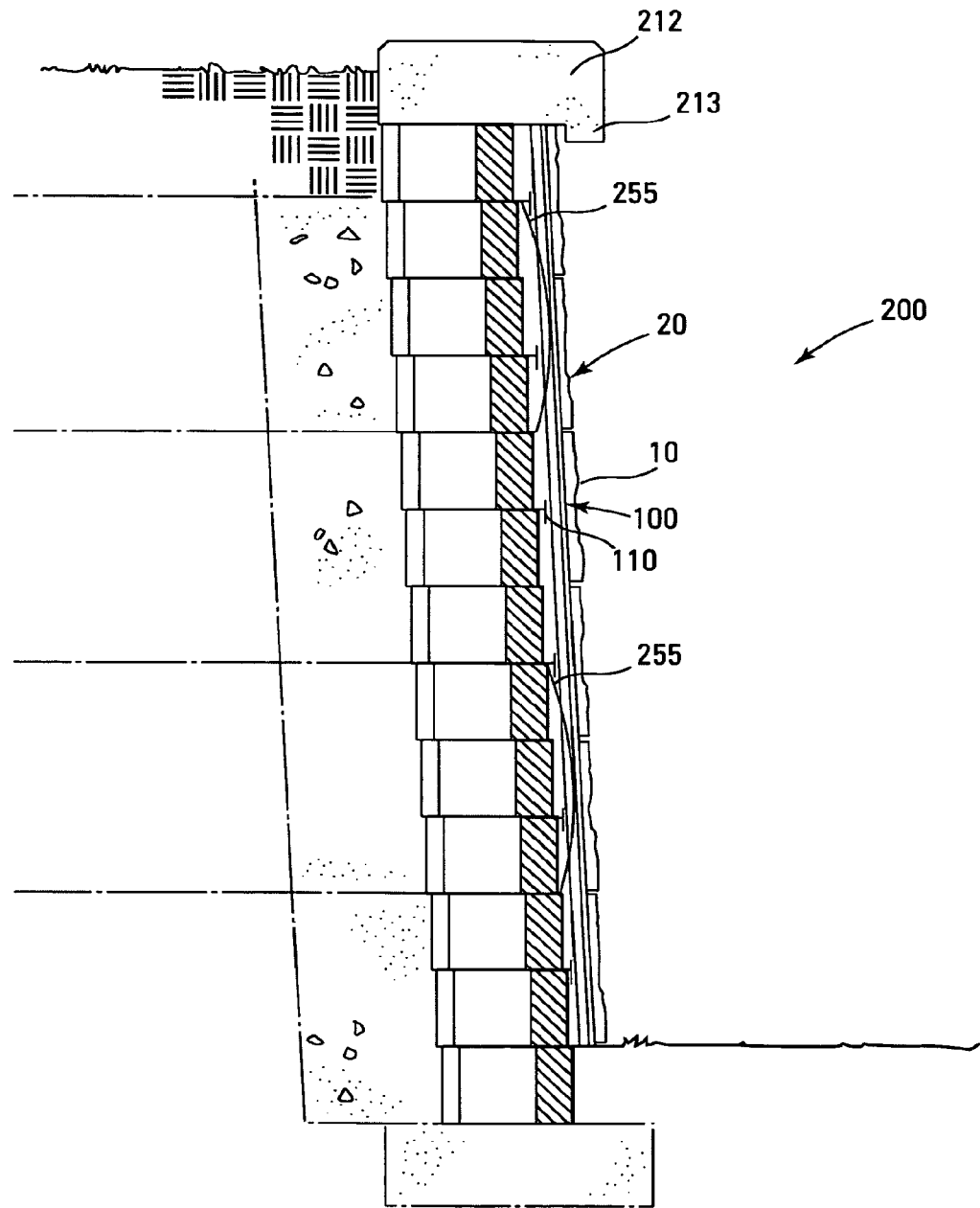
FIG. 11 is a sectional view of a completed retaining wall having two geogrid wraps.
Figure 12:
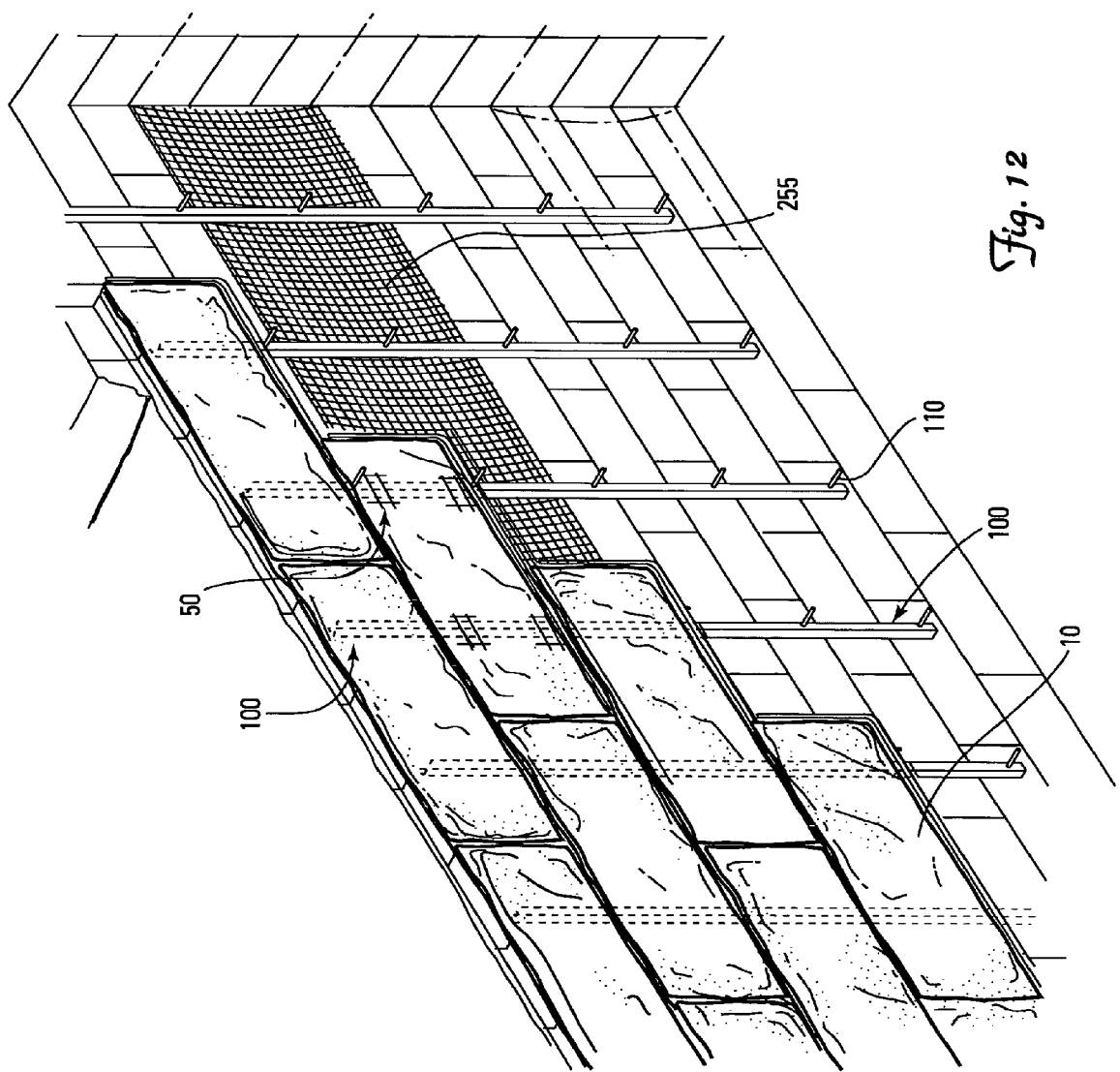
FIG. 12 is a partial perspective view of a veneer panel system of this invention with one geogrid wrap.

FIG. 11 shows the sectional view of a completed retaining wall with the veneer panel system 20 of this invention in place. The retaining wall has two geogrid wraps 255 and capping layer 212 that is provided with an overhang 213 under which veneer panel system 20 of this invention fits. Panels 10 are attached to rail 100 and held by bracket 110. This can be more clearly seen in FIG. 12, in which retaining wall 200 has one geogrid wrap 255. The veneer panel system is in a running bond pattern and is attached to rails 100. Rails 100 attach to the wall by brackets 110. For simplicity, only part of the wall is shown, and only one geogrid wrap is shown, though it is to be understood that more than one geogrid wrap can be used.

Figure 13A:
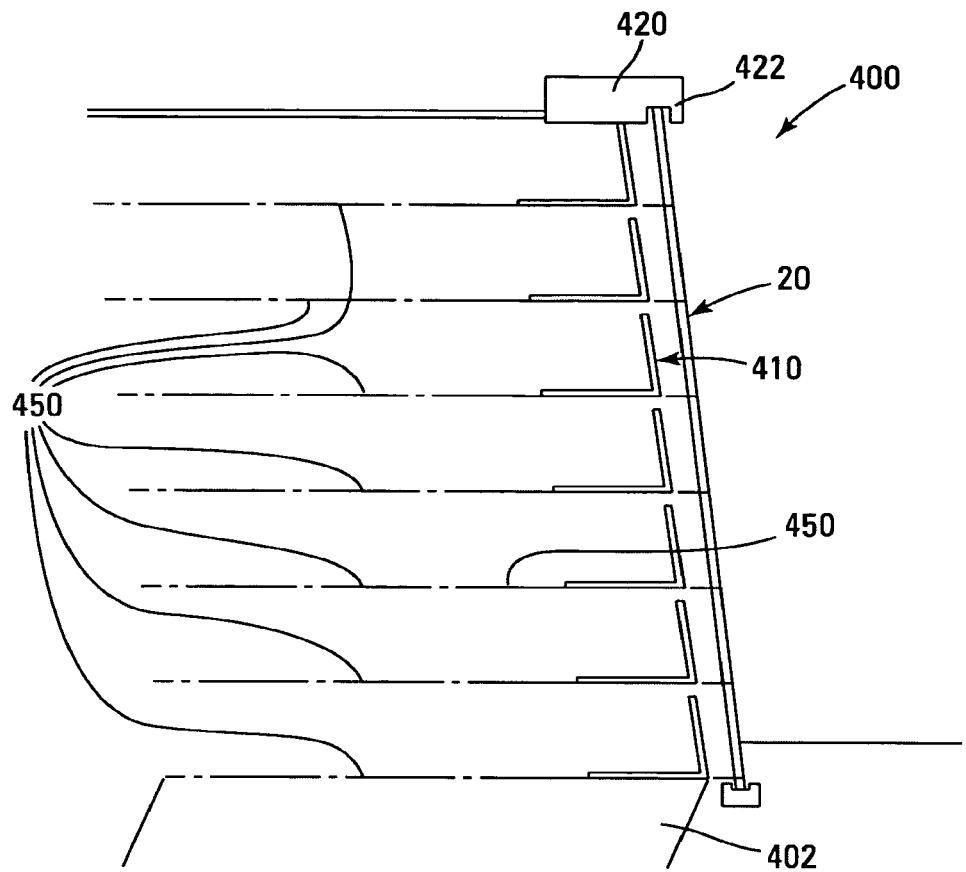
FIG. 13A is a sectional view of a wire basket retaining wall with geogrid and FIG. 13B is a perspective view of a wire basket.
Figure 13B:
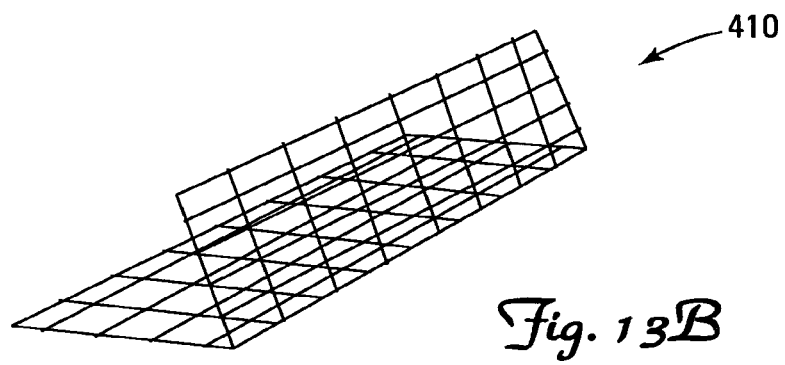

The veneer panel system of this invention is also suitable for use with other types of retaining wall systems. For example, as illustrated in FIG. 13A, multiple geogrids can be installed in a system that uses wire baskets filled with soil as retaining wall elements. A sectional view of a wall shows how geogrids are in place under each wire basket in wall 400. Wire basket 410 is shown in FIG. 13B. This type of retaining wall is often intended to be temporary. The first wire basket is set down over compacted soil or base layer 402, and geogrid 450 is laid down and attached to the wire basket. Soil and/or rocks are poured over this and compacted if necessary. Another wire basket and geogrid is put in place, filled with soil, and so on. The topmost layer can be a covering layer, such as plastic, or can be more soil or gravel. The veneer panel system of this invention is then installed by means of rails and brackets, as described above. A capping layer 420, with recess 422 to receive the veneer system 20, is used at the top of the wall.

Figure 14:
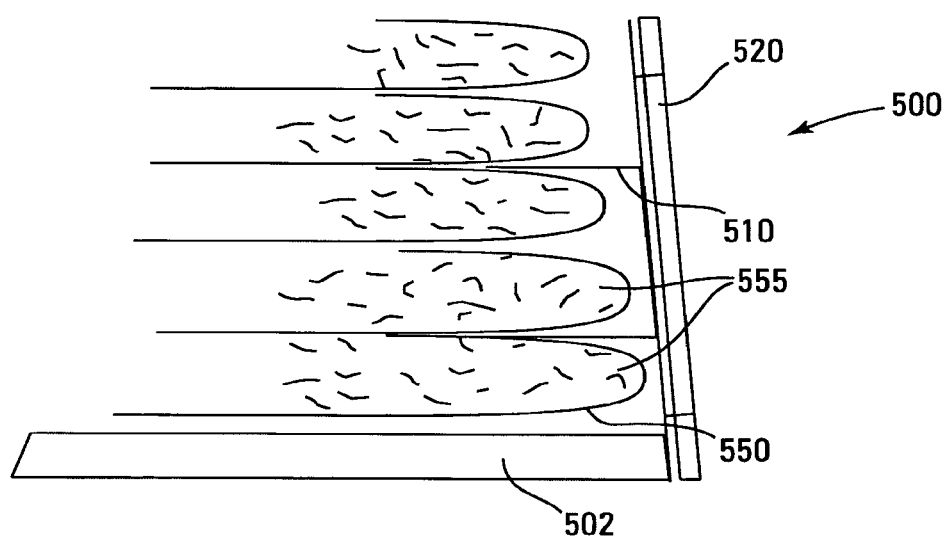
FIG. 14 is a partial sectional view of a retaining wall with a veneer panel system of this invention with multiple geogrid wraps.

Another alternative for temporary retaining wall use is shown in FIG. 14. In wall 500, geogrid 550 is laid down over compacted soil or base layer 502, dirt is placed on this, and the geogrid is laid back over the dirt to form geogrid wrap 555. Veneer panel system 520 is attached by means of brackets 510 that extend between geogrid wraps.

Figure 15:
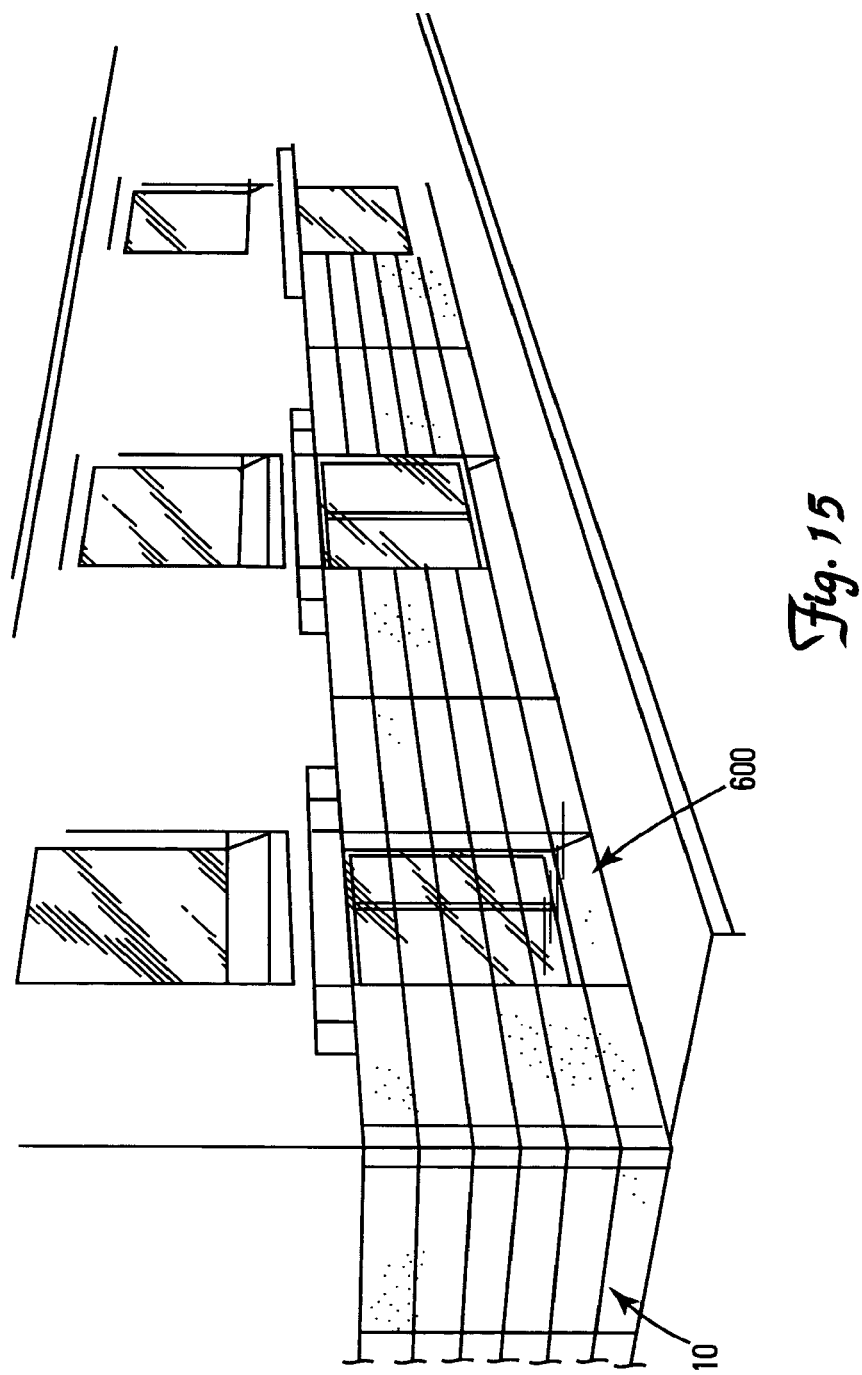
FIG. 15 is a perspective view of a building wall with the veneer panel system of this invention.

The veneer panel system can also be used with walls in buildings, such as shown in FIG. 15, wherein the panels 10 form a partial wall finish, such as wainscoting 600 on the face of a building. Attachment means are as previously described.

Figure 16A:
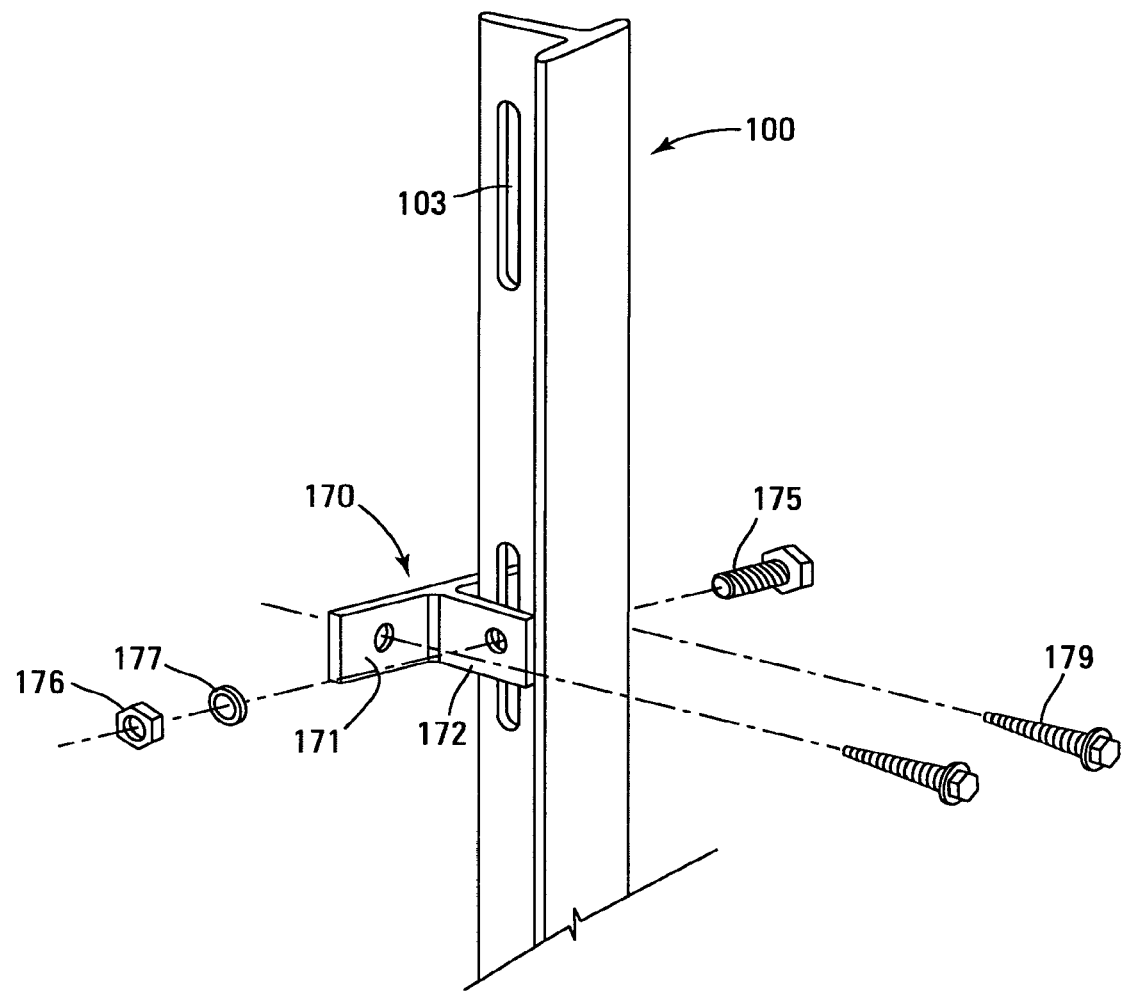
FIG. 16A is a perspective view of a rail showing attachment by an angle bracket and FIG. 16B is a top view of a portion of a wall having a rail attached by an angle bracket.
Figure 16B:
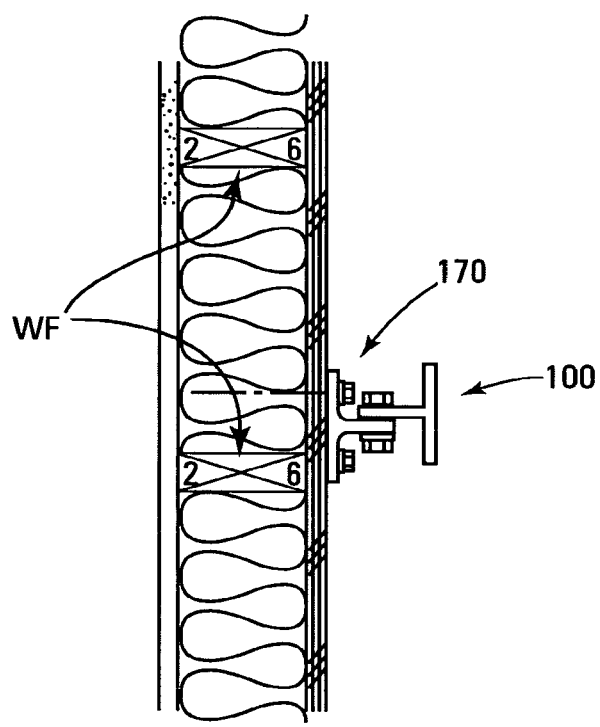

FIGS. 16A and 16B show an angle bracket suitable to attach a rail 100 to a wall, such as wood frame WF. The angle bracket can be installed at one or more slots 103 and positioned as desired. Angle bracket 170 has base section 171 and a perpendicular section 172 both of which are provided with bores through which can be threaded bolts or screws. Bolt 175 is held secure through section 172 by nut 176 and washer 177, thus attaching the bracket to the rail. Wood screws 179 thread through the bores in section 171, thus bolting the rail into the wall. A panel can then be attached to the rail as described above.

Although particular embodiments have been disclosed herein in detail, this has been done for purposes of illustration only, and is not intended to be limiting with respect to the scope of the following appended claims. In particular, it is contemplated by the inventors that various substitutions, alterations, and modifications may be made to the invention without departing from the spirit and scope of the invention as defined by the claims. For instance, the choices of materials or variations in shapes are believed to be a matter of routine for a person of ordinary skill in the art with knowledge of the embodiments disclosed herein.

What is claimed is:

1. A method of constructing a wall having a visually appealing exposed wall surface comprising:
   providing a plurality of wall blocks, at least some of the wall blocks having a recessed surface;
   stacking the plurality of wall blocks in courses to form a continuous exposed wall surface, each recessed surface forming a channel between a top surface of a wall block in a first course and a bottom surface of a wall block in a second adjacent course;
   providing a plurality of connecting elements having a first portion and a second portion;
   providing a plurality of facing members having a front face and a back face, the front face having a visually appealing pattern or texture;
   connecting the facing members to the exposed wall surface with the connecting elements such that the first portions of the connecting elements are received in the recessed surfaces of the wall blocks and the second portions of the connecting elements are connected to the facing members such that the facing members cover the exposed wall surface and the front faces of the facing members collectively form a visually appealing exposed wall face, and
   wherein the wall blocks have at least one core open to the top surface and bottom surface and wherein the recessed surface is open to the core.

2. The method of claim 1 wherein the wall blocks comprise concrete.

3. The method of claim 1 wherein the facing members comprise fiberglass.

4. The method of claim 1 wherein the facing members comprise mineral aggregate in fiberglass.

5. The method of claim 1 wherein the facing members comprise one of stone particles, sand and mineral mixed with resin.

6. The method of claim 1 wherein the step of connecting the facing members to the exposed wall surface with the connecting elements comprises connecting each connecting element to the back face of at least one facing member.

7. The method of claim 1 wherein the decorative front faces of the facing members have an appearance of stone.

8. The method of claim 1 wherein the facing members are formed in a mold by a molding process and wherein the step of connecting the facing members to the exposed wall surface with the connecting elements comprises embedding a portion of each connecting element in the mold of a facing member during the molding process of the facing members.

9. The method of claim 1 wherein the facing members are rectangular and have four side surfaces separating the front and back faces, two of the side surfaces having tongue members, the other two of the side surfaces having groove members.

10. The method of claim 9 wherein the side surfaces having tongue members are adjacent side surfaces.

11. The method of claim 1 wherein the decorative front faces of the facing members have a rectangular shape of a size selected to meet aesthetic or functional requirements of the wall.

12. The method of claim 1 wherein the wall is a retaining wall.

13. The method of claim 1 wherein during the step of connecting the facing members to the exposed wall surface with the connecting elements the back faces of the facing members are spaced a predetermined distance from the exposed wall surface.

14. The method of claim 1 wherein the recessed surface is on the bottom surface of the wall block.

15. The method of claim 1 wherein the connecting elements have end segments and wherein when the first portions of the connecting elements are received in the recessed surfaces, the end segments of the connecting elements are received in the cores of the wall blocks.

16. The method of claim 15 wherein the end segments are perpendicular to the first portions.

17. The method of claim 1 further comprising laying at least one layer of geogrid between at least one course of wall blocks.

18. The method of claim 17 wherein the at least one layer of geogrid is pulled up over a front surface and back around the top surface of the wall blocks of at least one upper course.

19. A method of constructing a wall having a visually appealing exposed wall surface comprising:
   providing wall blocks, each wall block having a recessed surface;
   stacking a plurality of the wall blocks in a first course;
   stacking a plurality of the wall blocks in a second course, the first and second courses forming an exposed wall surface, each recessed surface forming a channel between a top surface of one of the wall blocks in the first course and a bottom surface of one of the wall blocks in the second adjacent course;
   providing a plurality of connecting elements;
   providing a plurality of facing members having a front face and a back face, the front face having a visually appealing pattern or texture;
   inserting a first portion of a first connecting element into a recessed surface; and
   connecting a second portion of the first connecting element to one of the facing members such that the one facing member covers a portion of the exposed wall surface, and
   wherein each wall block has at least one core open to the top surface and bottom surface and wherein the recessed surface is open to the core.

20. The method of claim 19 wherein the wall blocks comprise concrete.

21. The method of claim 19 wherein the facing members comprise fiberglass.

22. The method of claim 19 wherein the facing members comprise mineral aggregate in fiberglass.

23. The method of claim 19 wherein the facing members comprise one of stone particles, sand and mineral mixed with resin.

24. The method of claim 19 wherein the step of connecting the second portion to the one facing member comprises connecting the second portion of the first connecting element to the back face of the one facing member.

25. The method of claim 19 wherein the decorative front faces of the facing members have an appearance of stone.

26. The method of claim 19 wherein the facing members are formed in a mold by a molding process and wherein the step of connecting the second portion of the first connecting element to the one facing member comprises embedding the second portion in the mold of the one facing member during the molding process of the one facing member.

27. The method of claim 19 wherein the facing members are rectangular and have four side surfaces separating the front and back faces, two of the side surfaces having tongue members, the other two of the side surfaces having groove members.

28. The method of claim 27 wherein the side surfaces having tongue members are adjacent side surfaces.

29. The method of claim 19 wherein the decorative front faces of the facing members have a rectangular shape of a size selected to meet aesthetic or functional requirements of the wall.

30. The method of claim 19 wherein the first and second portions of the connecting elements are not integrated.

31. The method of claim 19 wherein the wall is a retaining wall.

32. The method of claim 19 wherein during the connecting step the back face of the one facing member is spaced a predetermined distance from the exposed wall surface.

33. The method of claim 19 wherein the first connecting element has an end segment and wherein when the first portion of the first connecting element is inserted into the recessed surface, a first end segment portion of the end segment of the first connecting element is received in the core of the wall block.

34. The method of claim 33 wherein the end segment is perpendicular to another segment of the first portion.

35. The method of claim 34 wherein a second end segment portion of the end segment of the first connection element is received in the core of a wall block in an adjacent course of wall blocks.

36. The method of claim 19 further comprising laying at least one layer of geogrid between the first and second courses of wall blocks.

37. The method of claim 36 wherein the at least one layer of geogrid is pulled up over a front surface and back around the top surface of the wall blocks of at least one upper course.

* * * * *